(12) United States Patent
Nagaoka et al.

(10) Patent No.: US 11,391,071 B2
(45) Date of Patent: Jul. 19, 2022

(54) VEHICLE DOOR LATCH DEVICE

(71) Applicant: MITSUI KINZOKU ACT CORPORATION, Yokohama (JP)

(72) Inventors: Tomoharu Nagaoka, Yokohama (JP); Sayaka Koyama, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 233 days.

(21) Appl. No.: 16/629,696

(22) PCT Filed: Oct. 23, 2017

(86) PCT No.: PCT/JP2017/038155
§ 371 (c)(1),
(2) Date: Jan. 9, 2020

(87) PCT Pub. No.: WO2019/016970
PCT Pub. Date: Jan. 24, 2019

(65) Prior Publication Data
US 2021/0079695 A1    Mar. 18, 2021

(30) Foreign Application Priority Data
Jul. 20, 2017   (JP) .............................. JP2017-140896

(51) Int. Cl.
*E05B 79/20*   (2014.01)
*B60J 5/04*    (2006.01)
(Continued)

(52) U.S. Cl.
CPC ............ *E05B 79/20* (2013.01); *B60J 5/0468* (2013.01); *E05B 77/34* (2013.01); *F16C 1/107* (2013.01);
(Continued)

(58) Field of Classification Search
CPC ........... F16C 1/107; F16C 1/24; B60J 5/0468; E05B 79/20
See application file for complete search history.

(56) References Cited

U.S. PATENT DOCUMENTS 4,892,005 A * 1/1990 Nagano ..................... B62L 3/00
                                                184/15.1
5,765,447 A * 6/1998 Goffena .................. F16C 1/107
                                                 74/502.5
(Continued)

FOREIGN PATENT DOCUMENTS

CN     205976809 U    2/2017
DE     10100636 A1    7/2002
(Continued)

OTHER PUBLICATIONS

EPO Translation of the Description of DE 10100636 A1, Kalesse, Jul. 18, 2002. (Year: 2021).*
(Continued)

*Primary Examiner* — Daniel D Yabut
(74) *Attorney, Agent, or Firm* — WHDA, LLP (57) ABSTRACT

In a vehicle door latch device, ingress of rainwater into an outer cable of a Bowden cable is prevented. Vehicle door latch device includes: operation handle provided in a door; door latch mechanism attached in the door; Bowden cable having outer cable that is fixed at one end to the vicinity of operation handle and at the other end to door latch mechanism, and inner cable that is inserted into outer cable while being coupled at one upward end to operation handle and at the other end to release lever of door latch mechanism; and elastic cap provided at one end of the outer cable, having the corresponding one of cover portions in a cylindrical shape, extending in a movement direction of the inner cable extending from the one end of the outer cable, to cover the inner cable.

4 Claims, 12 Drawing Sheets

(51) Int. Cl.
*F16C 1/10* (2006.01)
*F16C 1/24* (2006.01)
*E05B 85/24* (2014.01)
*E05B 77/34* (2014.01)

(52) U.S. Cl.
CPC .............. *F16C 1/24* (2013.01); *E05B 85/243* (2013.01); *E05Y 2201/654* (2013.01); *E05Y 2900/531* (2013.01)

(56) References Cited

U.S. PATENT DOCUMENTS

| | | | | |
|---|---|---|---|---|
| 5,785,152 | A | * | 7/1998 | Fujita .................. F16C 1/24 184/15.1 |
| 5,809,840 | A | * | 9/1998 | Oda .................. F16C 1/107 74/502.6 |
| 8,414,038 | B2 | | 4/2013 | Bedekar et al. |
| 2003/0173786 | A1 | | 9/2003 | Miyagawa et al. |
| 2015/0233153 | A1 | | 8/2015 | Smart et al. |

FOREIGN PATENT DOCUMENTS

| | | |
|---|---|---|
| DE | 202014102033 U1 | 7/2015 |
| FR | 3022604 A1 | 12/2015 |
| JP | S58-65312 A | 4/1983 |
| JP | 62-17061 B2 | 4/1987 |
| JP | 4-1968 U | 1/1992 |
| JP | 2001-279981 A | 10/2001 |
| JP | 3708719 B2 | 10/2005 |
| JP | 3946535 B2 | 7/2007 |
| JP | 2015-533964 A | 11/2015 |

OTHER PUBLICATIONS

International Search Report dated Jan. 9, 2018, issued in counterpart application No. PCT/JP2017/038155 (2 pages).
Written Opinion dated Jan. 9, 2018, issued in counterpart application No. PCT/JP2017/038155 (5 pages).
Office Action dated Mar. 29, 2021, issued in counterpart CN Application No. 201780092808.9, with English translation. (13 pages).
Extended European Search Report dated Apr. 8, 2021, issued in counterpart EP Application No. 17918303.3. (19 pages).

* cited by examiner

VEHICLE DOOR LATCH DEVICE

TECHNICAL FIELD

This application is based upon and claims the benefit of priority from Japanese Patent Application No. 2017-140896, filed on Jul. 20, 2017. The entire contents of this application are incorporated herein by reference.

The present invention relates to a vehicle door latch device that includes a Bowden cable for transmitting operation of an outside handle to a door latch mechanism.

BACKGROUND ART

A door latch mechanism is disposed in a door, and releases engagement with a striker on a vehicle body side based on door opening operation of an outside handle provided in the door outside a vehicle to enable the door to be opened. A Bowden cable is used as means for transmitting door opening operation of the outside handle to a door latch device.

Patent Literature 1 describes a Bowden cable that includes an outer cable and an inner cable inserted into the outer cable. The inner cable is coupled at one end to an outside handle, and at the other end to a release lever of a door latch mechanism. Accordingly, when the outside handle is subjected to door opening operation, the inner cable is pulled up to operate the release lever.

CITATION LIST

Patent Literature

Patent Literature 1: U.S. Pat. No. 8,414,038

SUMMARY OF INVENTION

The object of the present invention described above, and other objects, features and advantages of the present invention, will be made apparent by detailed descriptions below with reference to accompanying drawings each showing an example of the present application.

Technical Problem to be Solved

Unfortunately, an outside handle disposed on a vehicle exterior side of a door is generally disposed above a door latch mechanism, so that one end of each of an inner cable and an outer cable coupled to the outside handle faces upward. This may cause rainwater entering the inside of the door along the outside handle to enter the inside of the outer cable. When rainwater enters the inside of the outer cable, freezing or rust may occur inside the outer cable to cause a malfunction.

The present invention is made in light of the above-mentioned circumstances, and an object thereof is to provide a vehicle door latch device that prevents ingress of rainwater into an outer cable of a Bowden cable.

Solution to Problem

To solve the technical problem described above, technical means according to the present invention includes: an operation handle supported by a handle base provided in a door; a door latch mechanism that maintains the door in a closed state; a Bowden cable having an outer cable that is fixed at one end to the handle base and at the other end to the door latch mechanism, and an inner cable that is inserted into the outer cable while being coupled at one end to the operation handle and at the other end to a release lever of the door latch mechanism; and an elastic cap having a cover portion in a cylindrical shape, extending in a movement direction of the inner cable to cover the inner cable extending from the one end of the outer cable.

It is preferable that the cover portion of the elasticity cap is formed in a bellows shape capable of expansion and contraction in the movement direction of the inner cable, and that the inner cable is bonded with adhesive to an outlet of the cover portion.

It is preferable that the elastic cap is filled with grease.

It is preferable that the door latch mechanism includes a cable holding portion for fixing the other end of the outer cable, and that the cable holding portion fixes the other end of the outer cable while being engaged with the Bowden cable in its axial direction and around its axis.

Effects of Invention

According to the present invention, providing the elastic cap covering the inner cable extending from one end upward of the outer cable enables stable operation to be acquired over a long period by preventing ingress of rainwater into the outer cable.

DESCRIPTION OF EMBODIMENTS

Figure 4:
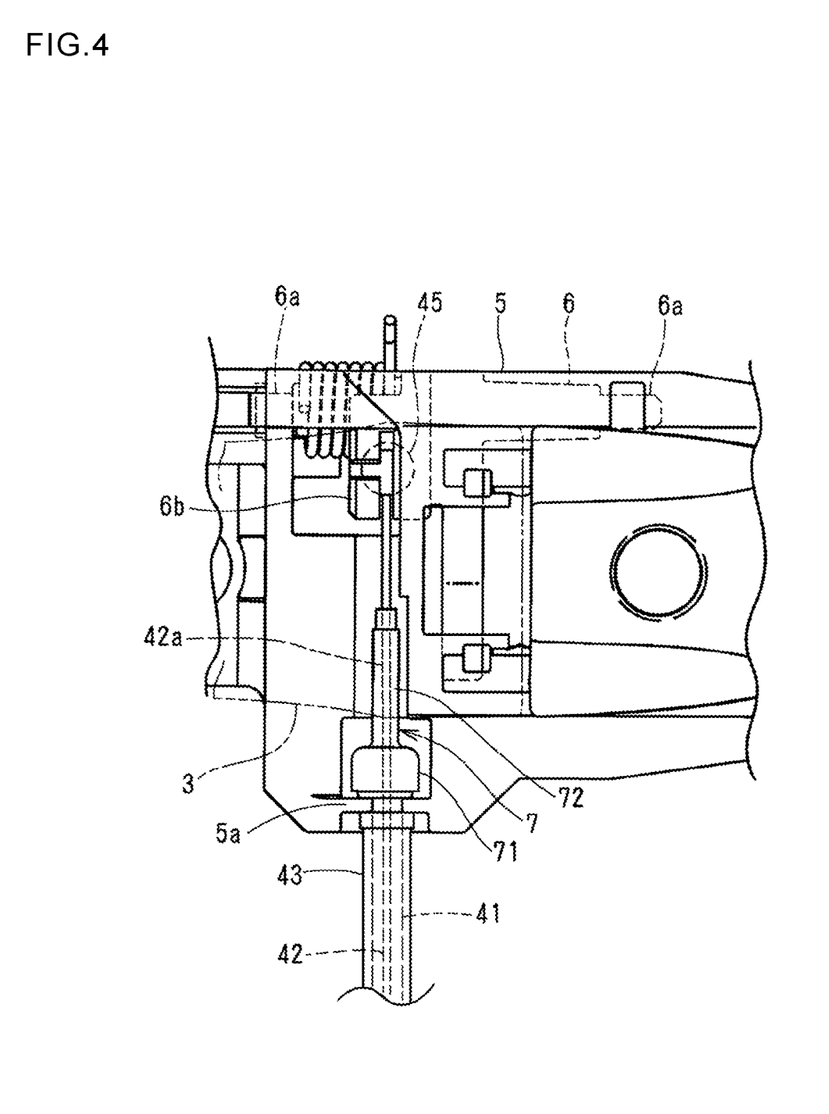
FIG. 4 is an enlarged front view of the vicinity of an outside handle using a first embodiment.
Figure 5:
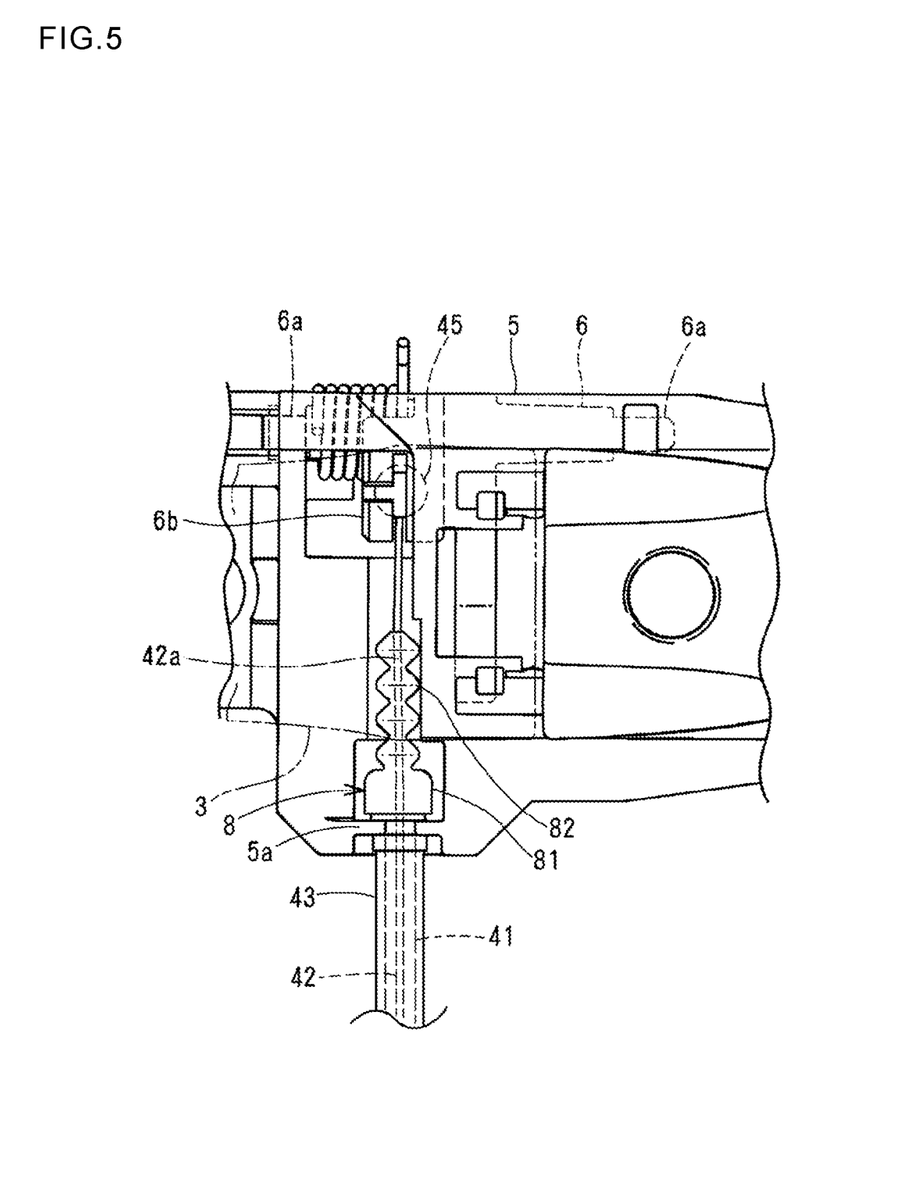
FIG. 5 an enlarged front view of the vicinity of an outside handle using a second embodiment.
Figure 6A:
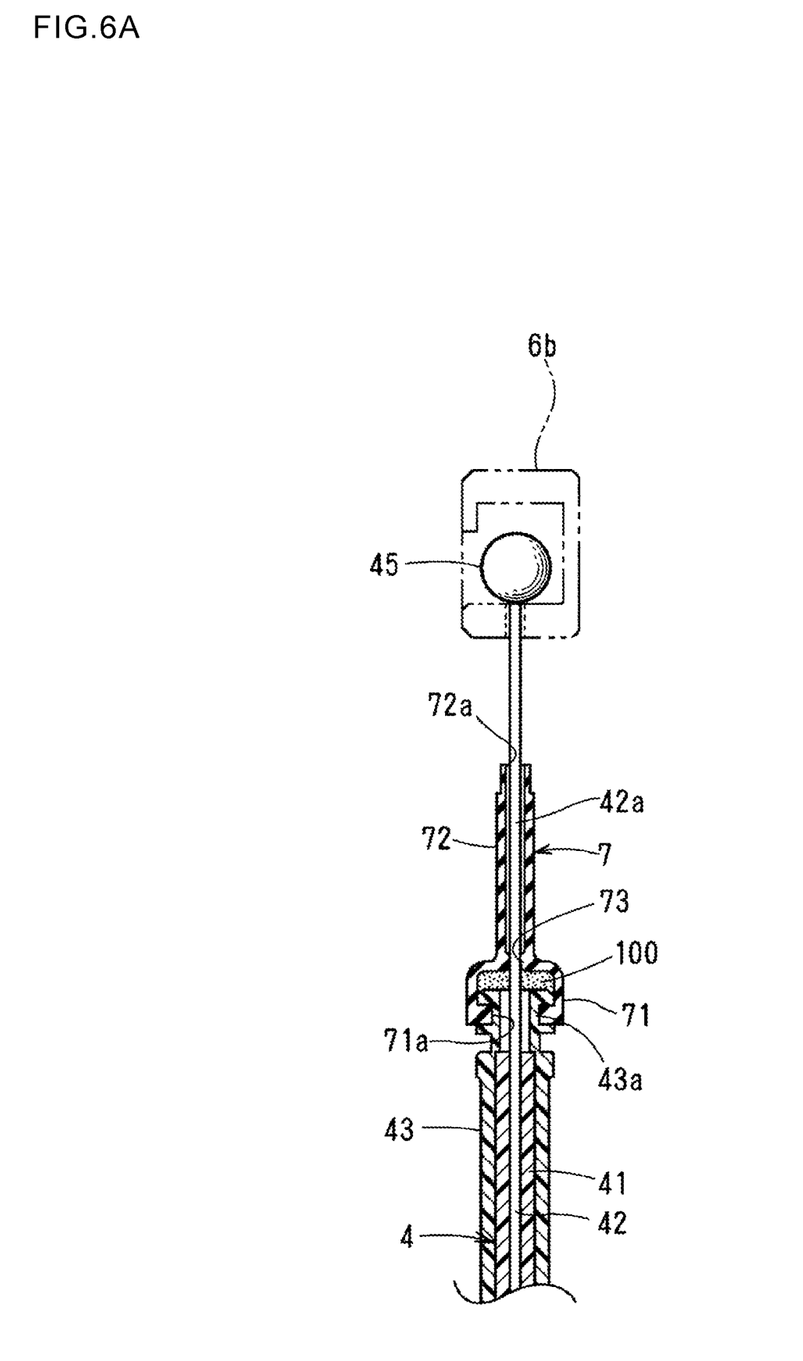
FIG. 6A is a longitudinal sectional view of an outside handle according to the first embodiment in a non-operated state.
Figure 6B:
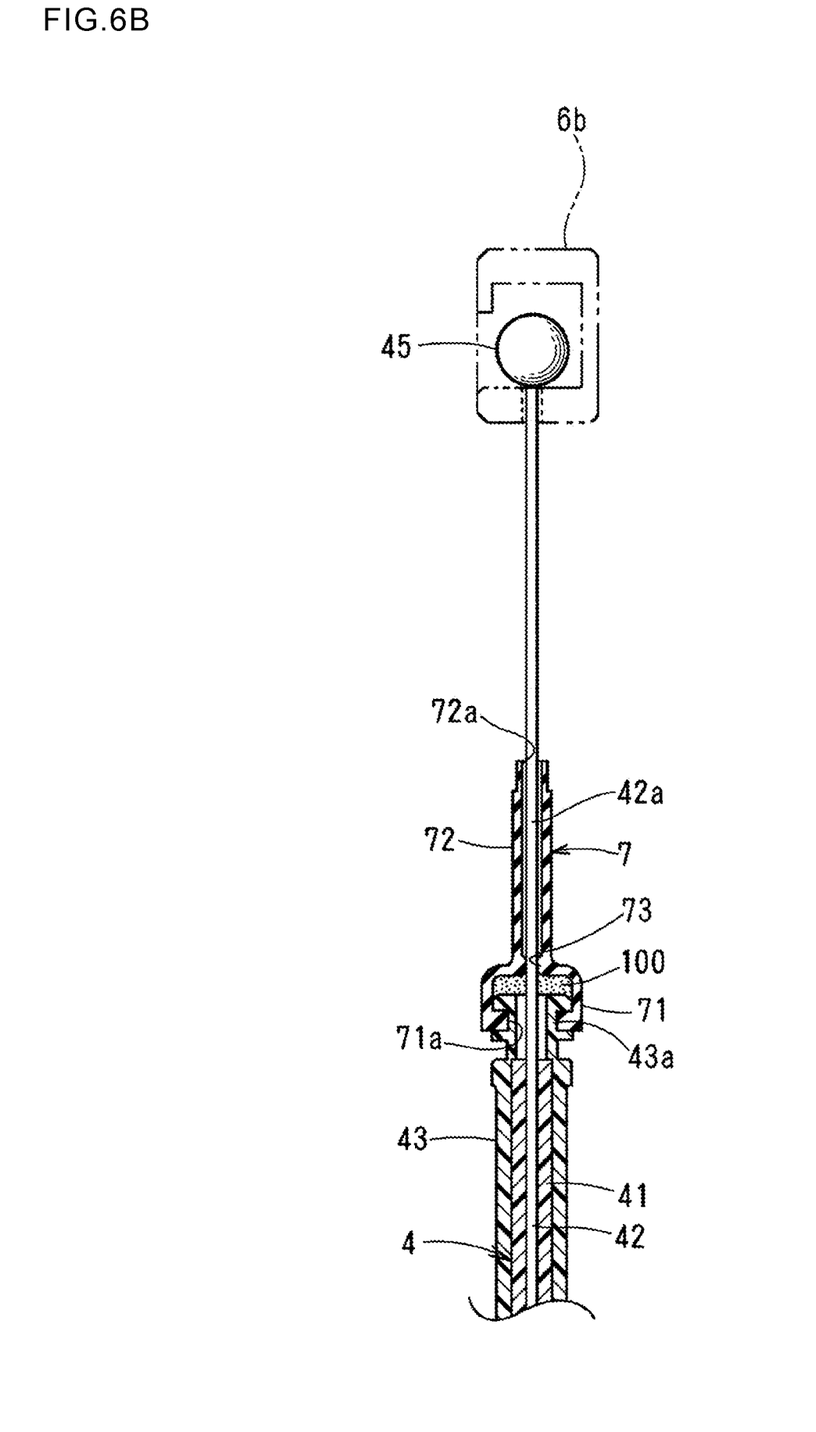
FIG. 6B is a longitudinal sectional view of an outside handle according to the first embodiment in an operated state.
Figure 7A:
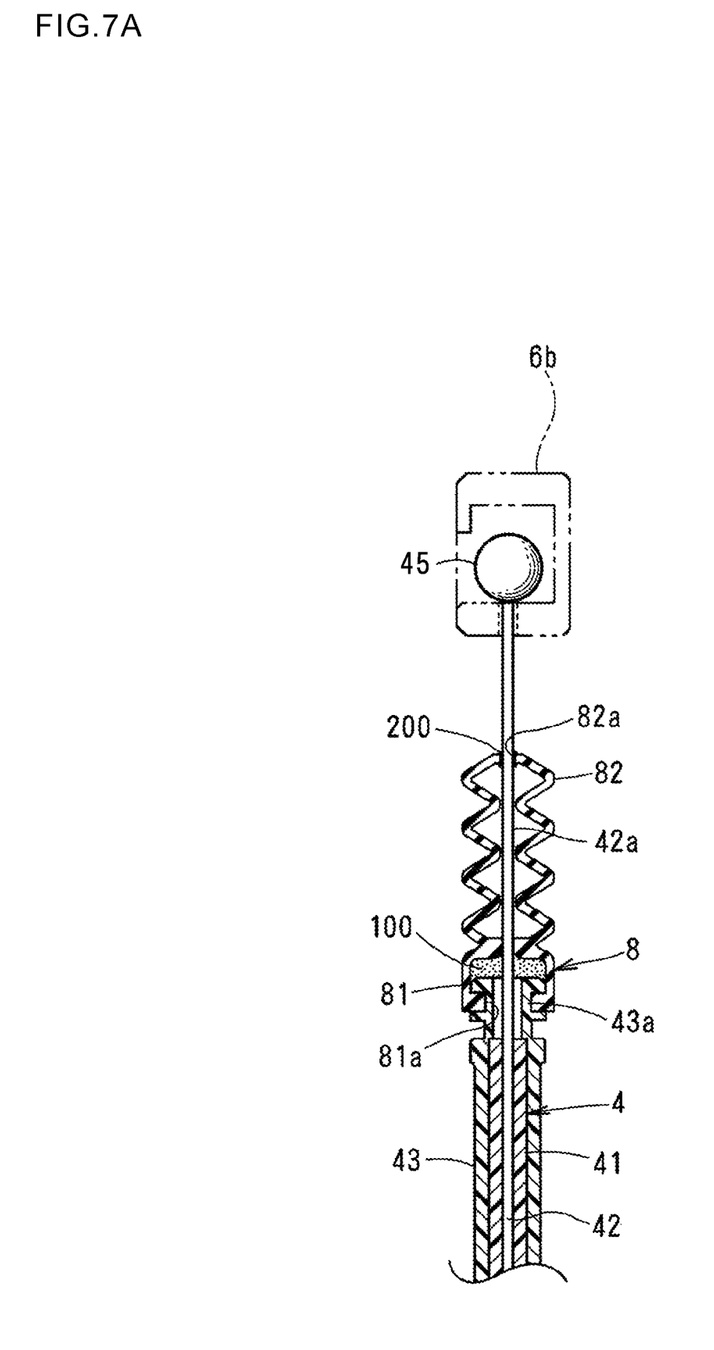
FIG. 7A is a longitudinal sectional view of an outside handle according to the second embodiment in a non-operated state.
Figure 7B:
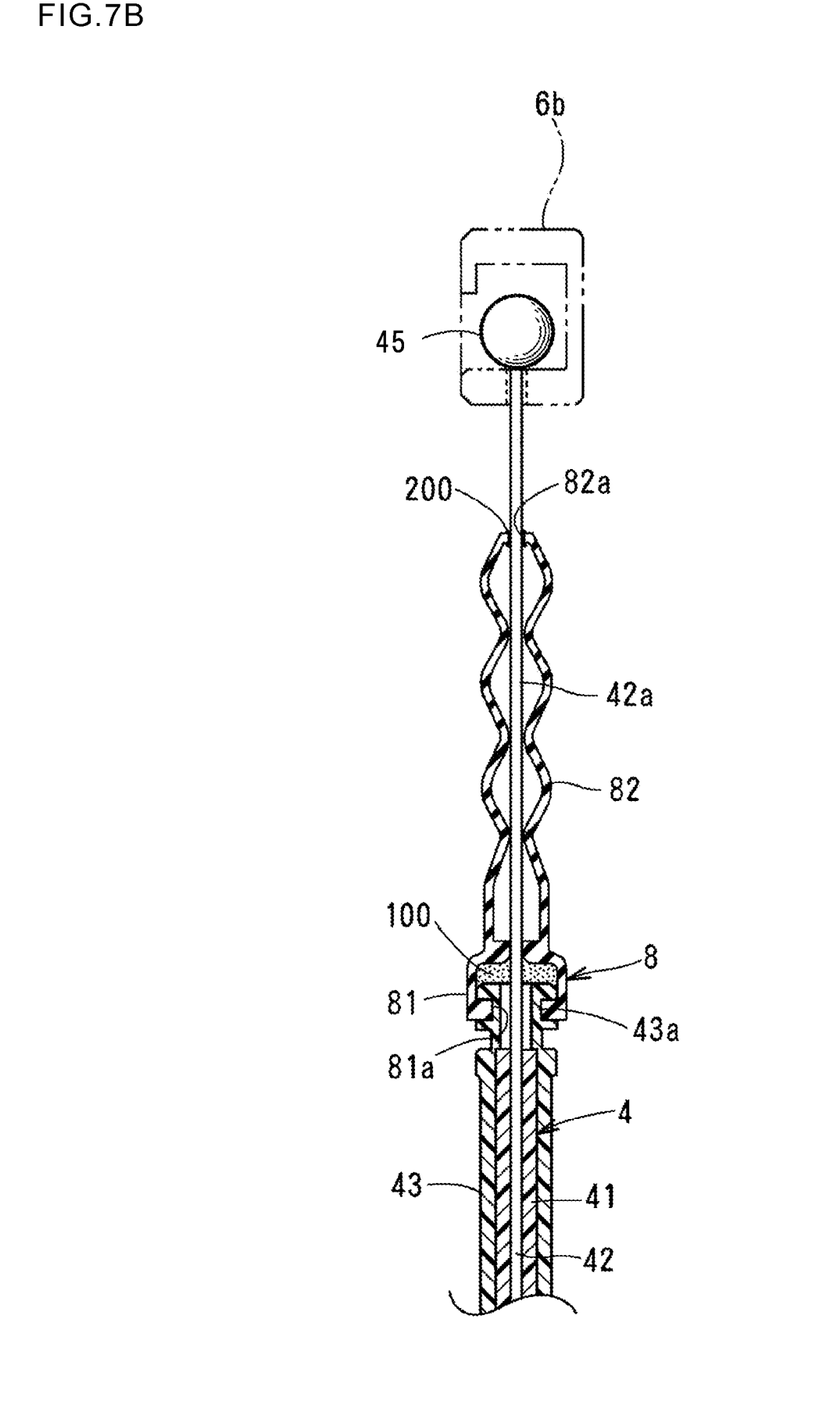
FIG. 7B is a longitudinal sectional view of an outside handle according to the second embodiment in an operated state.

As illustrated in FIGS. 1, 2, 4, and 5 to 7, vehicle door latch device 10 according to the present invention includes door latch mechanism 2, outside handle operation handle 3 (an example of an operation handle), Bowden cable 4, elastic cap 7 of a first embodiment (refer to FIGS. 2, 4, and 6) or elastic cap 8 of a second embodiment (refer to FIGS. 5 and 7).

Here, door latch mechanism 2 is disposed in door 1 of a vehicle. Outside handle 3 is disposed on a vehicle exterior side of door 1. Bowden cable 4 includes outer cable 41 that transmits door opening operation of outside handle 3 to release lever 24 described below of door latch mechanism 2, and inner cable 42 inserted into outer cable 41. Elastic cap 7 of the first embodiment and elastic cap 8 of the second embodiment prevent ingress of rainwater into outer cable 41 in Bowden cable 4.

Figure 1:
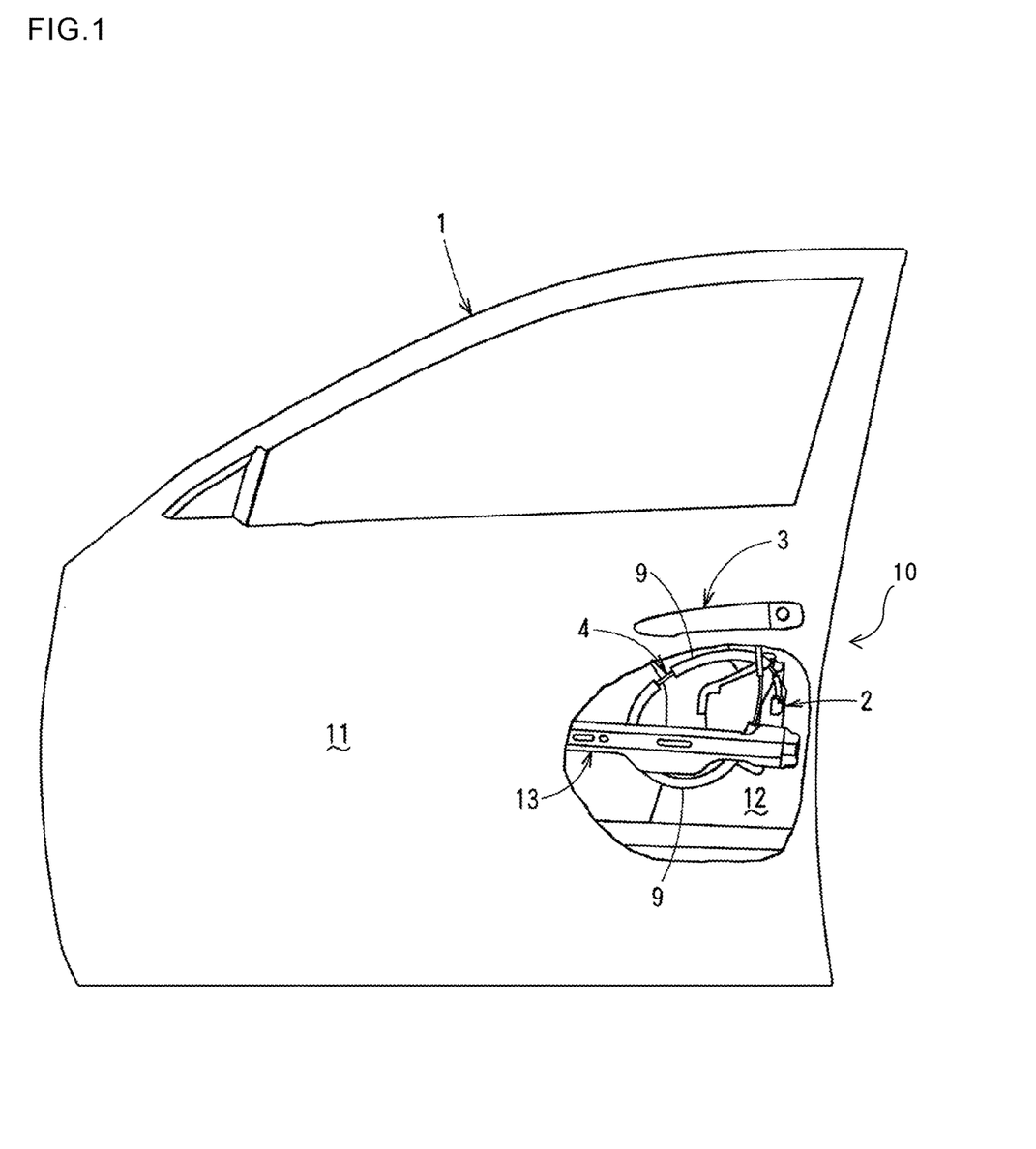
FIG. 1 is a side view of a door using a vehicle door latch device according to the present invention.
Figure 2:
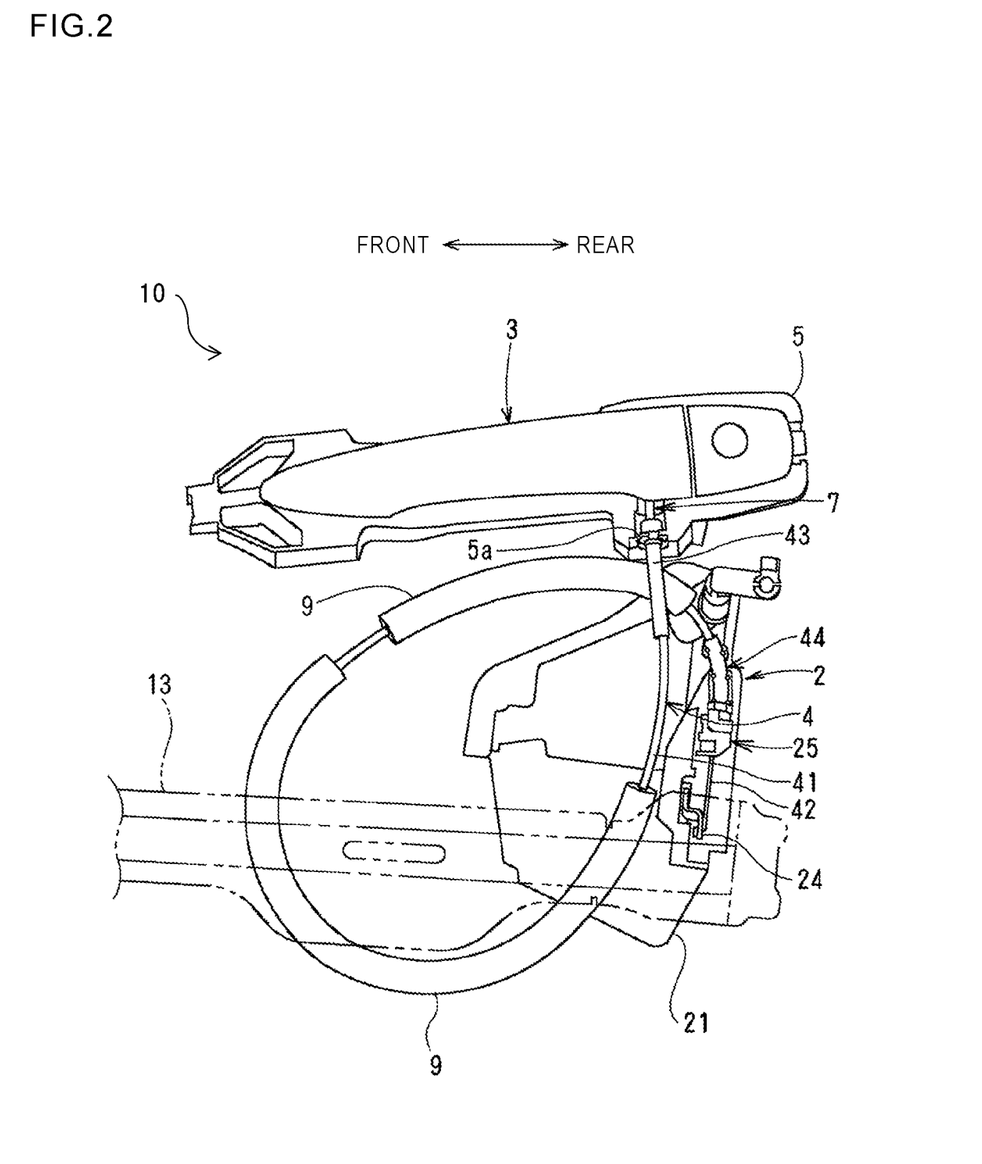
FIG. 2 is a side view of an outside handle and a door latch mechanism.

As illustrated in FIGS. 1 and 2, outside handle 3 is disposed above door latch mechanism 2 in a vertical direction, for example. In another view, door latch mechanism 2 is disposed below outside handle 3 in the vertical direction, for example.

Door 1 is formed of outer panel 11 on the vehicle exterior side and inner panel 12 on a vehicle interior side. Door 1 has a front end portion that is pivoted to a vehicle body side face to be openable and closable with a door hinge (not illustrated) having a rotating shaft with a vertical axis. Outer panel 11 is provided on its outer face with outside handle 3. Outer panel 11 of door 1 has an inner face to which door beam 13 extending in a longitudinal direction is fastened.

Figure 3:
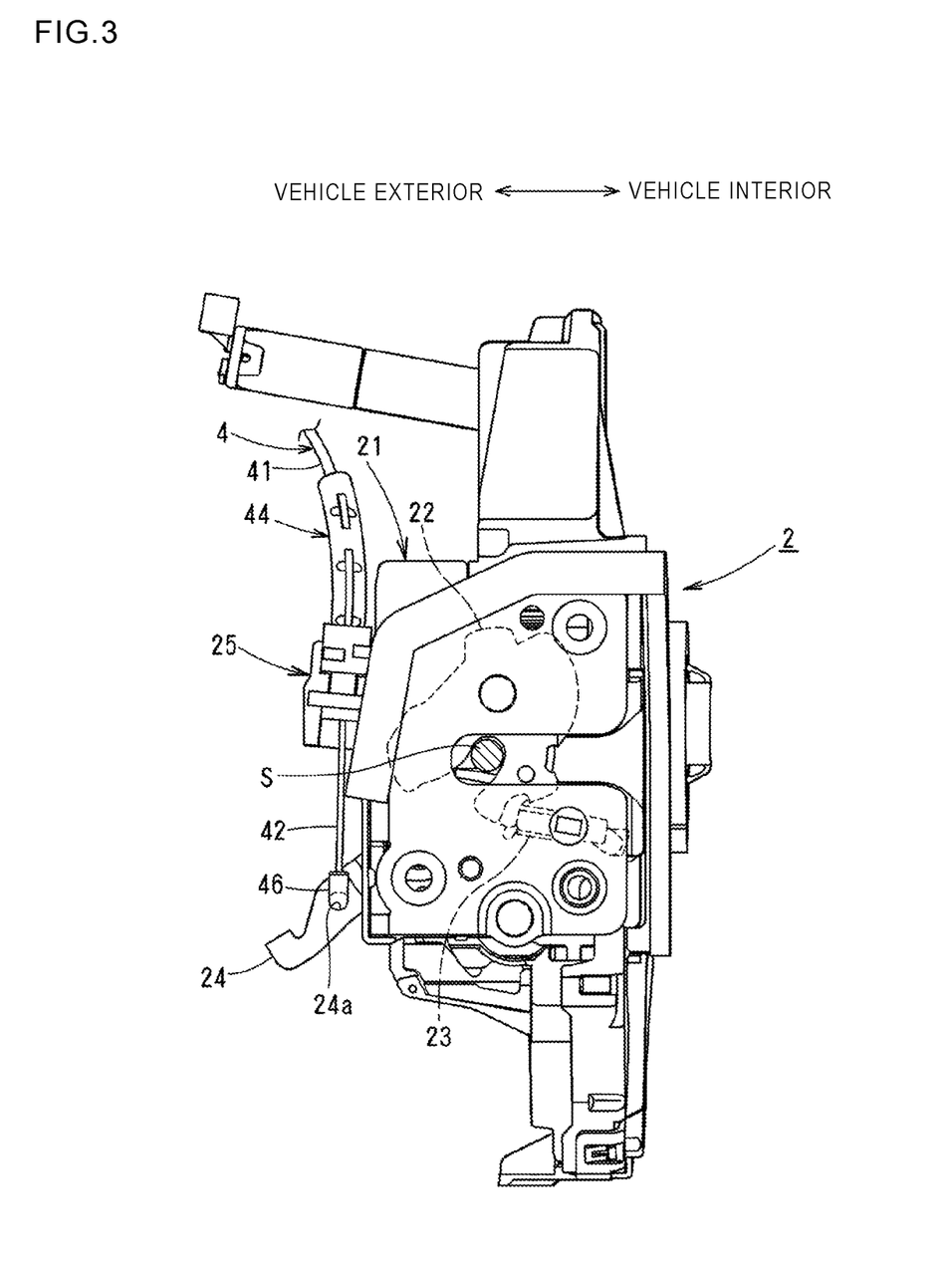
FIG. 3 is a front view of a door latch mechanism.

As illustrated in FIG. 3, door latch mechanism 2 has an engagement unit including latch 22 and ratchet 23, various levers, and housing 21.

Latch 22 is detachable from a striker S fastened to a vehicle body. Ratchet 23 is detachable from latch 22. The various levers are directly or indirectly coupled to ratchet 23. Housing 21 is made of synthetic resin to cover the various levers. The various levers include also release lever 24.

Release lever 24 is pivoted in a lower portion of housing 21. Terminal part 46 fastened to a downward end of inner cable 42 of Bowden cable 4 is coupled to coupling portion 24a projecting from housing 21 in release lever 24. This causes release lever 24 to receive door opening operation of outside handle 3 to operate ratchet 23 for release. As a result, engagement between ratchet 23 and latch 22 is released to enable door 1 to be opened.

Figure 8:
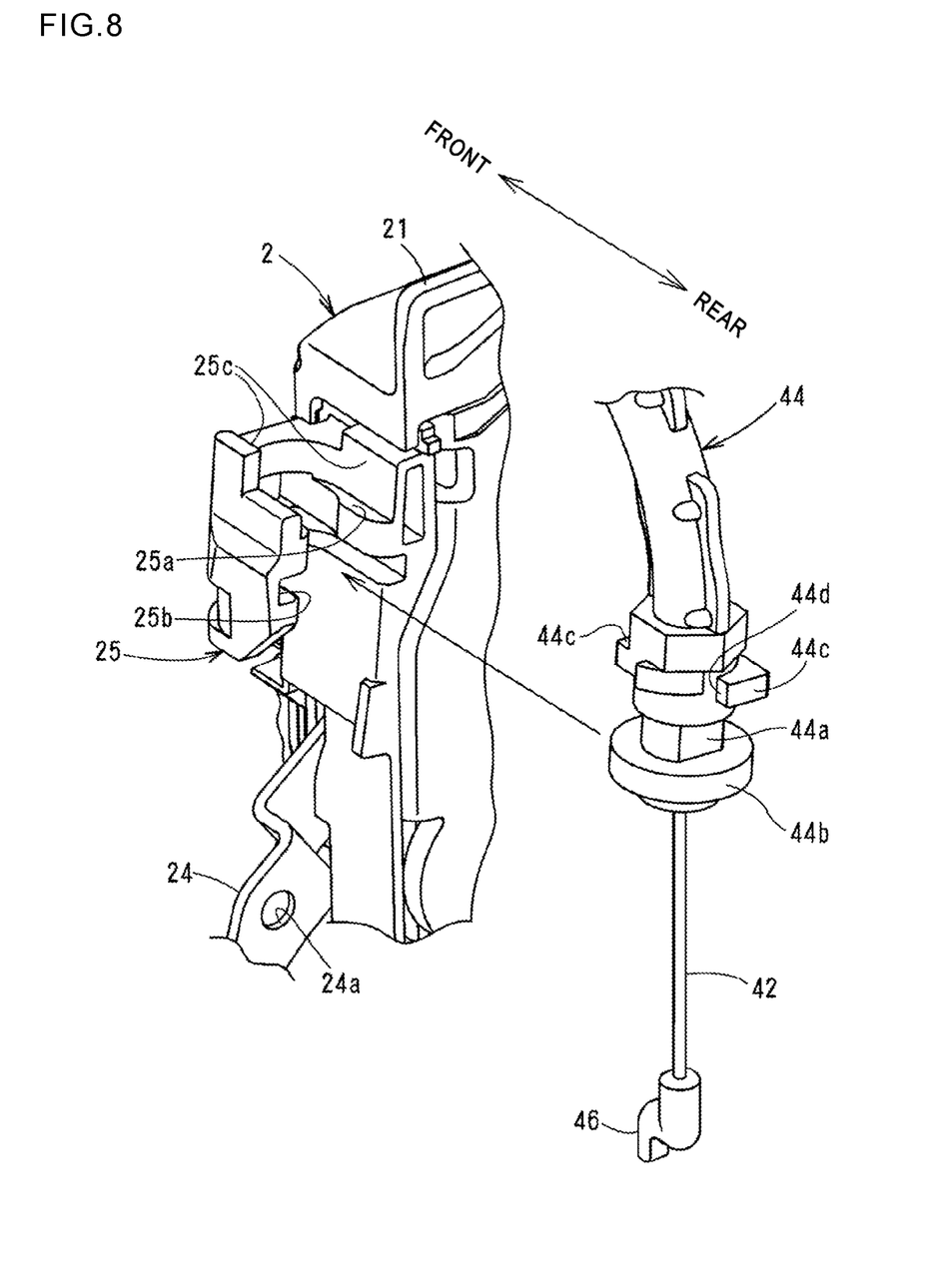
FIG. 8 is a perspective view of the other end of a Bowden cable and a cable holding portion.

Cable holding portion 25 for fixing an end portion of outer cable 41 in Bowden cable 4 is integrally formed in a portion of housing 21, above release lever 24 (refer to FIGS. 3 and 8). Structure of cable holding portion 25 and the end portion of outer cable 41 will be described below in detail.

As illustrated in FIG. 2, outside handle 3 is supported in handle base 5 fixed to an inner face of outer panel 11 to be capable of swinging outward about a shaft with a vertical axis. Lever 6 configured to operate together with door opening operation of outside handle 3 is pivoted in handle base 5 to be able to turn around shaft 6a with an axis in a longitudinal direction through a predetermined angle, as illustrated in FIGS. 4 and 5. Terminal part 45 fastened to an upper end of inner cable 42 is coupled to coupling portion 6b being a turning end in lever 6, as illustrated in FIGS. 4 and 5. As described above, door opening operation of outside handle 3 is transmitted to release lever 24 of door latch mechanism 2 with lever 6 and inner cable 42.

Bowden cable 4 includes flexible outer cable 41, and flexible inner cable 42 inserted into outer cable 41. As illustrated in FIG. 2, Bowden cable 4 is coupled at upper end (one end) to outside handle 3, and at lower end (the other end) to door latch mechanism 2. Bowden cable 4 extends, along the inner face of outer panel 11, obliquely downward, forward from its upper end on an outside handle 3 side, then turns upward, and extend downward to reach its lower end on a door latch mechanism 2 side, in a form of being wired in door 1, as illustrated in FIGS. 1 and 2.

It is preferable to apply zinc plating to a surface of inner cable 42. This prevents rust from occurring in inner cable 42 to enable smooth sliding to be acquired.

As illustrated in FIGS. 1 and 2, cushioning material 9 in a cylindrical shape is fitted onto outer cable 41 overlapping with door beam 13 in door 1 in a direction toward inside and outside door 1 to prevent an abnormal sound from occurring.

As illustrated in FIGS. 2, 4, and 5, one end upward of outer cable 41 is fixed to holding portion 5a of handle base 5 with handle-side end cap 43 in a cylindrical shape fastened to the one end upward. As illustrated in FIGS. 4, 5, 6A, and 6B, inner cable 42 extending upward from a tip of handle-side end cap 43 is coupled to coupling portion 6b of lever 6 with terminal part 45 fastened to the tip. Terminal part 45 of inner cable 42 may be configured to be directly coupled to a movable part of outside handle 4, instead of coupling portion 6b of lever 6. In this case, lever 6 is eliminated.

In the description below, a portion in inner cable 42, extending upward from the tip of handle-side end cap 43, is referred to as handle-side projecting cable 42a (refer to FIGS. 4, 5, 6A, 6B, 7A, and 7B) for convenience of explanation.

Elastic cap 7 made of rubber according to the first embodiment illustrated in FIG. 4, or elastic cap 8 made of rubber according to the second embodiment illustrated in FIG. 5, is fixed to handle-side end cap 43 fastened to one end of outer cable 41. Each of elastic caps 7 and 8 prevents ingress of rainwater into outer cable 41 from the one end of outer cable 41 by covering handle-side projecting cable 42a of inner cable 42. Each of elastic caps 7 and 8 will be described below in detail.

As illustrated in FIGS. 2 and 8, the other end downward of outer cable 41 is fixed to cable holding portion 25 of door latch mechanism 2 with door-latch-side end cap 44 fastened to the other end. Inner cable 42 extending downward from a tip (lower end) of door-latch-side end cap 44 is coupled to release lever 24 of door latch mechanism 2 with terminal part 46 fastened to the tip.

Figure 9:
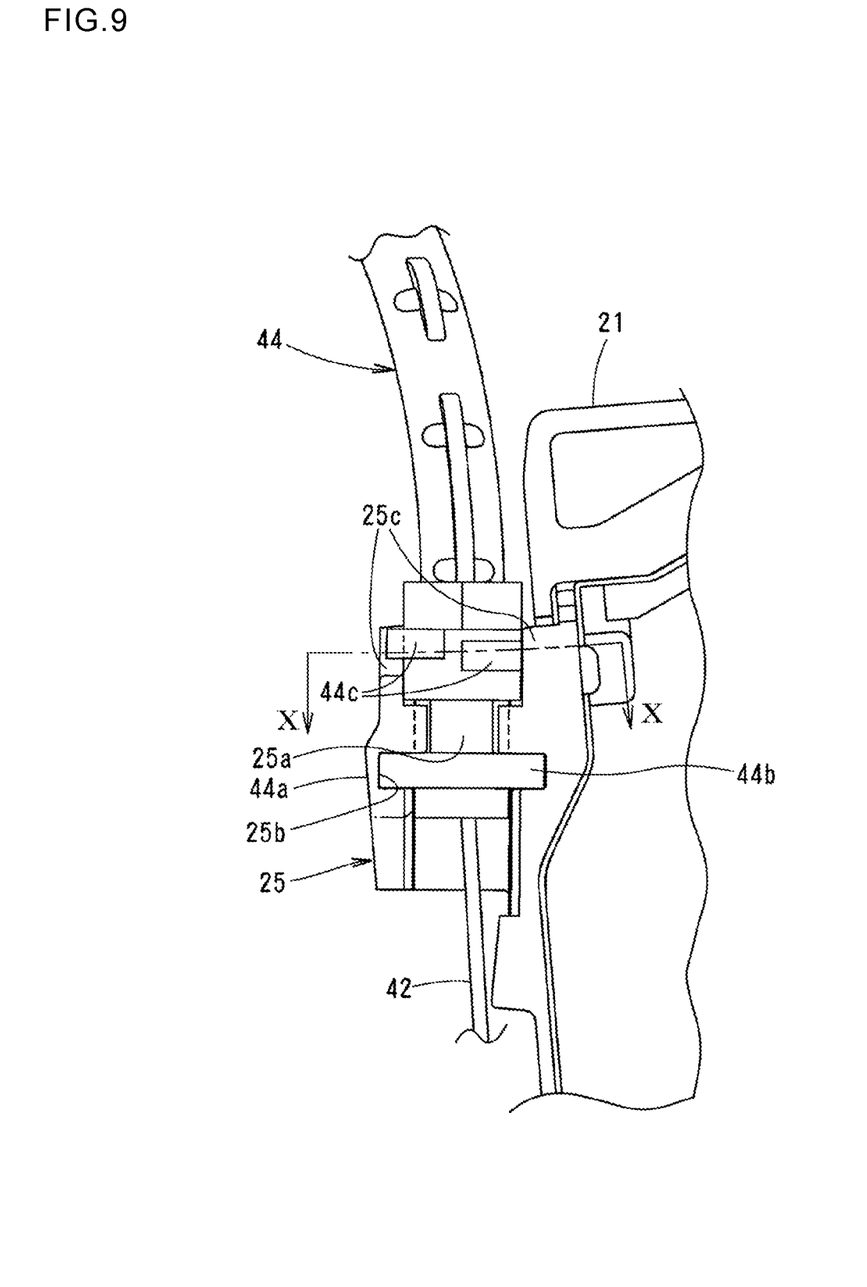
FIG. 9 is an enlarged front view of a main section of the other end of the Bowden cable and the cable holding portion, being fixed to each other.
Figure 10:
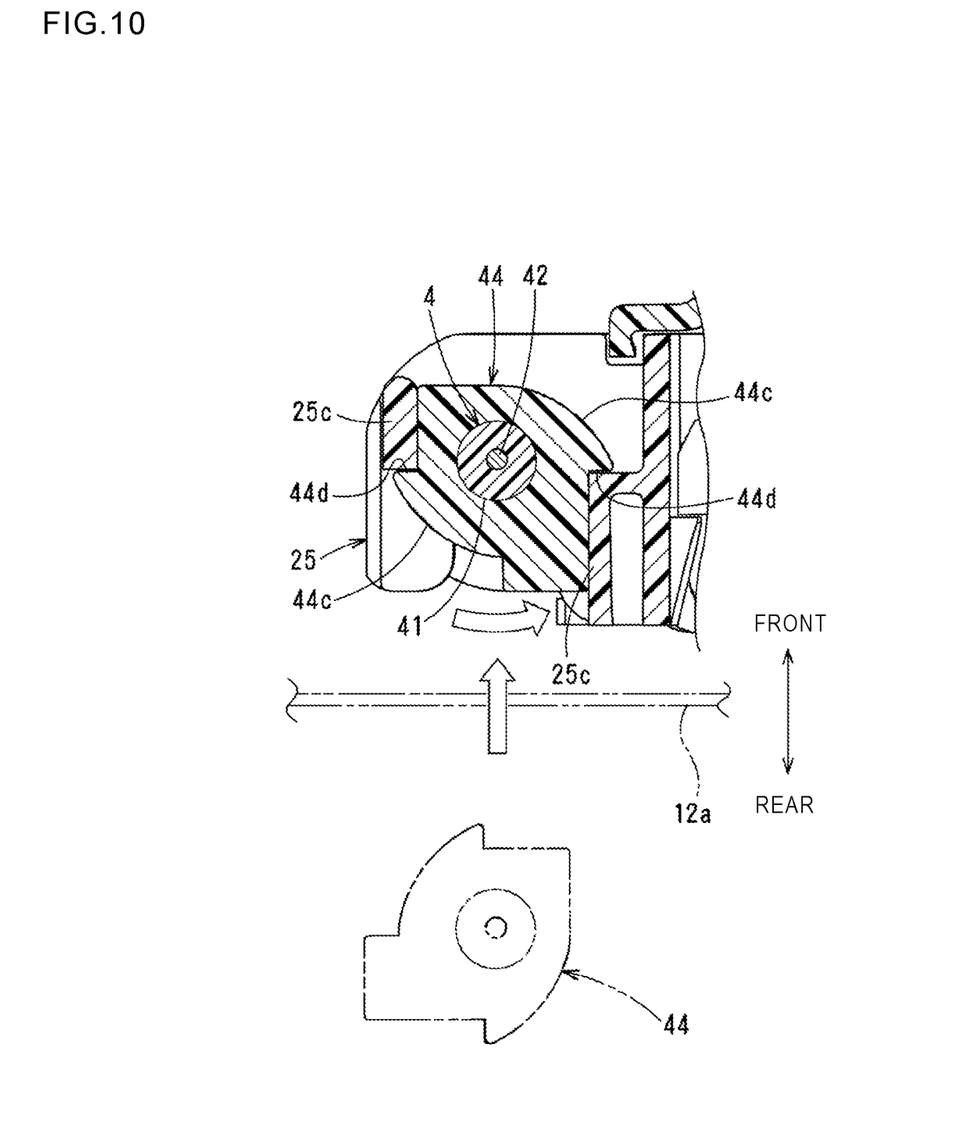
FIG. 10 is a cross-sectional view taken along line X-X in FIG. 9.

As illustrated in FIGS. 8 to 10, cable holding portion 25 of door latch mechanism 2 includes holding portion 25a in a U-shape in plan view, with an open side facing rear panel 12a (refer to FIG. 10) of inner panel 12, to which door latch mechanism 2 is fixed. Into holding portion 25a, a central pillar portion 44a in an oval shape in cross section of door-latch-side end cap 44 is inserted. Holding portion 25a has an opening facing rearward, the opening being formed to be slightly narrow in width corresponding to a minor-axis dimension of central pillar portion 44a.

In addition, groove 25b in a semicircular shape in cross section is formed in a portion below holding portion 25a in cable holding portion 25, as illustrated in FIG. 8. Into groove 25b, engagement flange 44b in the shape of a disk of door-latch-side end cap 44 is inserted from the rear in a vehicle toward the front in the vehicle, and is engaged. Engagement between groove 25b and engagement flange 44b reduces displacement of door-latch-side end cap 44 in a vehicle vertical direction with respect to cable holding portion 25. This causes the other end of outer cable 41 to be reliably fixed to cable holding portion 25.

Further, a pair of engagement projecting portions 25c and 25c is formed in a portion above holding portion 25a in cable holding portion 25. Rotating hooks 44c and 44c of door-latch-side end cap 44 are engaged with respective engagement projecting portions 25c and 25c. Each of rotating hooks 44c and 44c is formed integrally with door-latch-side end cap 44, and turns together with door-latch-side end cap 44. As illustrated in FIG. 10, a part of an outer peripheral surface of each of rotating hooks 44c and 44c is an arc face gradually increasing in radius, and the arc face is provided at its terminal end with the corresponding one of claw portions 44d and 44d formed radially.

Door-latch-side end cap 44 is fixed to cable holding portion 25 as follows.

First, door-latch-side end cap 44 is set such that a major-axis of central pillar portion 44a faces in a vehicle longitudinal direction like door-latch-side end cap 44 illustrated by a two-dot chain line in in FIG. 10. Next, door-latch-side end cap 44 is inserted into cable holding portion 25 from the rear in a vehicle toward the front. In this case, the insertion is performed such that central pillar portion 44a is fitted into holding portion 25a, engagement flange 44b is fitted into groove 25b, and rotating hooks 44c and 44c are fitted between engagement projecting portions 25c and 25c.

Subsequently, when door-latch-side end cap 44 is turned together with outer cable 41 in a counterclockwise direction as viewed from vertically above, like door-latch-side end cap 44 illustrated by a solid line in FIG. 10, the arc face gradually increasing in radius of each of rotating hooks 44c and 44c is brought into contact with the corresponding one of engagement projecting portions 25c and 25c to expand the portion. Then, when turning of door-latch-side end cap 44 through a predetermined angle (90 degrees) is finished, claw portions 44d and 44d of respective rotating hooks 44c and 44c are engaged with respective engagement projecting portions 25c and 25c, as illustrated by a solid line in FIG. 10.

As described above, displacement of Bowden cable 4 in door-latch-side end cap 44 in its axial direction (longitudinal direction) is prevented by engagement of engagement flange 44b with groove 25b. In addition, turning of Bowden cable 4 around its axis is prevented by engagement of engagement projecting portions 25c and 25c with respective claw portions 44d and 44d. This causes the other end of outer cable 41 to be reliably fixed to cable holding portion 25 of door latch mechanism 2.

As illustrated in FIG. 10, an opened rear side of cable holding portion 25 faces rear panel 12a while being close to rear panel 12a of inner panel 12. Thus, door-latch-side end cap 44 is not removed rearward from the opening of cable holding portion 25, so that cable holding portion 25 is reliably fixed.

Next, elastic caps 7 and 8 of the corresponding first and second embodiments will be described.

FIG. 6A is a longitudinal sectional view of a main section of outside handle 3 according to the first embodiment in a non-operated state. FIG. 6B is a longitudinal sectional view of a main section of outside handle 3 according to the first embodiment in an operated state.

Elastic cap 7 according to the first embodiment includes: fitting portion 71 increased in diameter with a length of about ¼ of elastic cap 7, formed on its lower side in its longitudinal direction (vertical direction); and cover portion 72 in a cylindrical shape with a small diameter and a length of about ¾ of elastic cap 7, formed on its upper side while extending in a movement direction of handle-side projecting cable 42a.

Fitting portion 71 is fixed to an upper end of handle-side end cap 43 when annular projecting portion 71a formed on its inner peripheral surface is fitted onto annular groove 43a formed in an outer periphery of an upper end portion of handle-side end cap 43. When fitting portion 71 is fitted and fixed onto handle-side end cap 43, handle-side projecting cable 42a of inner cable 42 is covered with cover portion 72 in its movement direction. Handle-side projecting cable 42a passes through the inside of cover portion 72 to extend from outlet 72a being the tip of cover portion 72, and then terminal part 45 at a tip of handle-side projecting cable 42a is coupled to coupling portion 6b of lever 6. It is preferable to set an inner diameter of cover portion 72 so as to be slightly larger than an outside diameter of handle-side projecting cable 42a. This causes a minute clearance between an inner peripheral surface of cover portion 72 and an outer peripheral surface of handle-side projecting cable 42a, so that the first embodiment can reduce ingress of rainwater from outlet 72a of cover portion 72 to a minimum. As a result, the first embodiment prevents ingress of rainwater into outer cable 41.

In an inner peripheral surface of the boundary between fitting portion 71 and cover portion 72, there is provided annular projecting portion 73 that is always in close contact with a part of the surface of handle-side projecting cable 42a of inner cable 42 throughout its whole circumference in the circumferential direction. In other words, between fitting portion 71 and cover portion 72, there is provided annular projecting portion 73 (an example of a part of cover portion 72) that is always in close contact with a part of the surface of handle-side projecting cable 42a of inner cable 42 throughout its whole circumference in the circumferential direction. In still other words, above fitting portion 71 or below cover portion 72, there is provided annular projecting portion 73 that is always in close contact with a part of the surface of handle-side projecting cable 42a of inner cable 42 throughout its whole circumference in the circumferential direction. As a result, when inner cable 42 vertically moves through the inside of cover portion 72 of elastic cap 7 in response to door opening operation of outside handle 3, inner cable 42 vertically slides while an outer peripheral surface of inner cable 42 is in close contact with annular projecting portion 73. Thus, the first embodiment reliably prevents ingress of rainwater into elastic cap 7. This enables the first embodiment to reliably prevent ingress of rainwater into outer cable 41. It is preferable to pour silicon grease 100 into a space formed between fitting portion 71 and the upper end of handle-side end cap 43. This enables the first embodiment to more reliably prevent ingress of rainwater into outer cable 41 with silicon grease 100.

FIG. 7A is a longitudinal sectional view of a main section of outside handle 3 according to the second embodiment in a non-operated state. FIG. 7B is a longitudinal sectional view of a main section of outside handle 3 according to the second embodiment in an operated state.

In the description below of the second embodiment, a difference from the first embodiment will be described, and description of the same portion is eliminated. In the second embodiment, the same component and the like as those of the first embodiment are each basically designated by the same reference sign in the description below and in FIGS. 7A and 7B.

Elastic cap 8 according to the second embodiment includes: fitting portion 81 increased in diameter with a length of about ¼ of elastic cap 8, formed on its lower side in its longitudinal direction (vertical direction); and cover portion 82 in a cylindrical shape and a bellows shape with a length of about ¾ of elastic cap 8, formed on its upper side while extending in a movement direction of handle-side projecting cable 42a.

Fitting portion 81 is fixed to an upper end of handle-side end cap 43 when annular projecting portion 81a formed on its inner peripheral surface is fitted onto annular groove 43a formed in an outer periphery of an upper end portion of handle-side end cap 43.

Handle-side projecting cable 42a of inner cable 42 passes through the inside of cover portion 82 of elastic cap 8 to project upward from outlet 82a being an upper end of cover portion 82. Then, a portion in handle-side projecting cable 42a, passing through outlet 82a, is bonded with adhesive 200 to outlet 82a so as to allow the inner periphery of outlet 82a to be completely sealed throughout its whole circumference in the circumferential direction. In another view, cover portion 82 includes outlet 82a that completely seal a part of the surface of handle-side projecting cable 42a of inner cable 42 throughout its whole circumference in the circumferential direction. As a result, when inner cable 42 vertically moves in response to door opening operation of outside handle 3, cover portion 82 in a bellows shape vertically expands and contracts by following vertical motion of inner cable 42. This enables inner cable 42 to be vertically and smoothly moved. In addition, outlet 82a of cover portion 82 is completely closed with adhesive 200 and inner cable 41, so that the second embodiment enables ingress of rainwater into elastic cap 8 and outer cable 41 to be reliably prevented. It is preferable to pour silicon grease 100 into a space formed between fitting portion 81 and the upper end of handle-side end cap 43. This enables the second embodiment to more reliably prevent ingress of rainwater into outer cable 41 with silicon grease 100.

While several preferable forms of the present invention are shown in detail and described, it should be understood that various changes and modifications may be made without departing from the spirit and scope of claims attached.

REFERENCE SIGNS LIST 1 door
2 door latch mechanism
3 outside handle (operation handle)
4 Bowden cable
5 handle base
5a holding portion
6 lever
6a shaft
6b coupling portion
7 elastic cap
8 elastic cap
9 cushioning material
10 vehicle door latch device
11 outer panel
12 inner panel
12a rear panel
13 door beam
21 housing
22 latch
23 ratchet
24 release lever
24a coupling portion
25 cable holding portion
25a holding portion
25b groove
25c engagement projecting portion
41 outer cable
42 inner cable
42a handle-side projecting cable
43 handle-side end cap
43a annular groove
44 door-latch-side end cap
44a central pillar portion
44b engagement flange
44c rotating hook
44d claw portion
45, 46 terminal part
71 fitting portion
71a annular projecting portion
72 cover portion
72a outlet
73 annular projecting portion
81 fitting portion
81a annular projecting portion
82 cover portion
82a outlet
100 silicon grease
200 adhesive

The invention claimed is:

1. A vehicle door latch device comprising:
   an operation handle that is supported by a handle base provided in a door;
   a door latch mechanism that maintains said door in a closed state;
   a Bowden cable including an outer cable that is fixed at one end to said handle base and at an other end to said door latch mechanism, and an inner cable that is inserted into said outer cable, the inner cable being coupled at one end to said operation handle and at an other end to a release lever of said door latch mechanism; and
   an elastic cap that has having a cover portion in a cylindrical shape and extending in a movement direction of said inner cable to cover said inner cable extending from the one end of said outer cable, wherein
   said cover portion defines a clearance with the inner cable,
   said elastic cap includes an annular projecting portion projecting inwards to have a sliding contact with a part of said inner cable in a circumferential direction around a circumference of said inner cable,
   said annular projecting portion is provided below said cover portion,
   said cover portion is formed in a bellows shape capable of expansion and contraction in a movement direction of said inner cable,
   and said cover portion has an outlet bonded with adhesive to said inner cable, and
   said elastic cap contains grease.

2. The vehicle door latch device according to claim 1, wherein
   said outlet completely seals a part of said inner cable throughout its whole circumference in the circumferential direction when said outlet is bonded with adhesive to said inner cable.

3. The vehicle door latch device according to claim 1, wherein
   said elastic cap includes a fitting portion that is provided below said cover portion to cover said inner cable in a movement direction of said inner cable, and
   said grease is contained in said fitting portion.

4. The vehicle door latch device according to claim 1, wherein
   said door latch mechanism includes a cable holding portion that fixes the other end of said outer cable, and
   said cable holding portion fixes the other end of said outer cable while being engaged with said Bowden cable in its axial direction and around its axis.

* * * * *